No. 780,582. PATENTED JAN. 24, 1905.
F. H. RICHARDS.
GOLF BALL.
APPLICATION FILED APR. 16, 1902.

Witnesses:
Robert Head
A. C. Abbott

Inventor:
F. H. Richards.

No. 780,582.

Patented January 24, 1905.

UNITED STATES PATENT OFFICE.

FRANCIS H. RICHARDS, OF HARTFORD, CONNECTICUT.

GOLF-BALL.

SPECIFICATION forming part of Letters Patent No. 780,582, dated January 24, 1905.

Application filed April 16, 1902. Serial No. 103,132.

*To all whom it may concern:*

Be it known that I, FRANCIS H. RICHARDS, a citizen of the United States, residing at Hartford, in the county of Hartford and State of Connecticut, have invented certain new and useful Improvements in Golf-Balls, of which the following is a specification.

This invention relates to playing-balls, the objects being to provide a ball of improved construction and quality especially adapted for use in the game of golf.

According to my present improvements I employ a core or center piece which I usually make of metal, but which may be made of gutta-percha or the like, and this core is incased within an envelop of soft rubber which is provided with interior cells or pockets, said envelop being incased within a hard, stiff, springy shell formed, preferably, of celluloid, gutta-percha, or other plastic material.

Figure 1:
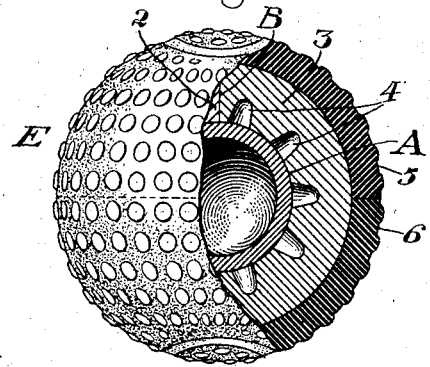
Figure 2:
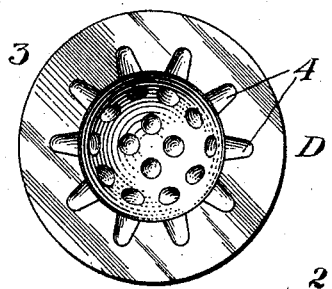
Figure 3:
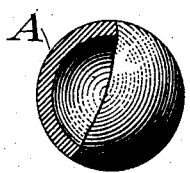
Figure 5:
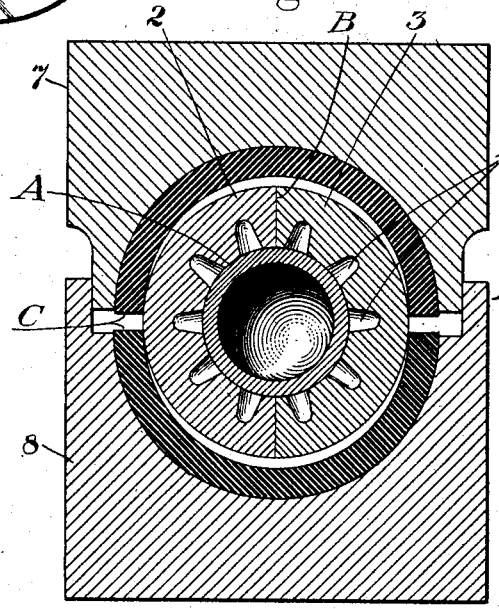
Figure 4:
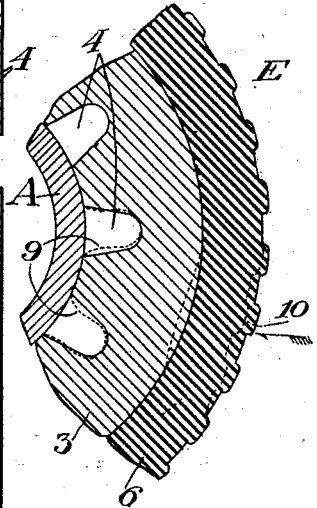

In the drawings accompanying and forming part of this specification, Figure 1 illustrates a complete ball, partly broken away to disclose the construction. Fig. 2 illustrates a hemispherical segment of soft rubber provided with cells. Fig. 3 illustrates a hollow metal center piece. Fig. 4 is an enlarged fragmentary detail showing diagrammatically the action of the rubber at the area of impact, and Fig. 5 illustrates the preferred method of completing the ball.

Similar characters of reference designate like parts throughout the drawings.

Upon a metal or other hard core A, I cement hemispherical segments 2 and 3 of highly-vulcanized soft rubber, which are provided with cells or pockets 4, preferably on or close to the interior side of said envelop. The ball thus formed I place between hemispherical shell-segments 5 and 6, preferably placing the latter so that the seam B between the rubber segments runs at right angles to the edges C of the shell-segments 5 and 6. The ball thus assembled I place between heating and forming dies 7 and 8, which I bring together forcibly while heated, thereby closing the shell upon the ball and welding the edges of the former. The rubber envelop D is preferably made oversize—that is, of a bulk somewhat too great for the capacity of the finished shell E. One of the objects of compressing the shell upon the envelop is to place the latter in a state of normal compression, thereby increasing the efficiency of the ball.

The cells or pockets 4 at the interior portion of the rubber envelop D permit the rubber to spread or flow, as at 9, when the ball has been dealt a blow, as at 10, as clearly illustrated at Fig. 4, and hence the rubber is not forced by said blow outwardly against the shell at other points, thereby eliminating or minimizing the liability of bursting the shell. It will be noted that the pockets are preferably remote from the exterior of the envelop in order that a solid-rubber cushion may intervene between the shell and the cellular portion of the envelop, particularly if the cells are large, so that uniform results may be obtained by blows at all points on the shell.

It is to be understood that while the cells or pockets in the envelop are shown disposed on the interior side or portion of said envelop and opening upon the face of the core still cellular soft rubber and solid soft rubber may be otherwise disposed and other modifications may be resorted to without departing from the spirit of this invention. The hard shell may be omitted, if desired, in adapting the ball for certain games, or other covers may be used.

Having thus described my invention, I claim—

1. A playing-ball comprising a hard core, a soft-rubber layer upon said core, said layer being provided upon its inner side with pockets, and a shell of gutta-percha holding said envelop under compression.

2. A playing-ball comprising a hollow metal core, a thick rubber envelop inclosing said core and having pockets only upon its inner side, and a plastic shell holding said envelop under compression.

3. A playing-ball comprising a hard center piece, thick solid soft-rubber segments cemented upon said center piece and each having a plurality of cells and a plastic shell holding said envelop under compression.

4. A playing-ball comprising a hard center piece, a thick solid soft-rubber envelop thereon and having a plurality of cells upon its inner side, and a gutta-percha shell holding said envelop under compression.

5. A playing-ball comprising a hard center piece, and segments of solid soft rubber thereon, each of said segments having a plurality of cells.

6. A playing-ball comprising a hard core and a soft-rubber envelop thereon; said envelop being provided with pockets upon its inner side.

FRANCIS H. RICHARDS.

Witnesses:
B. C. STICKNEY,
F. W. BARNACLO.